(12) United States Patent
Arnaldi

(10) Patent No.: US 6,450,343 B1
(45) Date of Patent: Sep. 17, 2002

(54) PACKAGING, IN PARTICULAR FOR FOOD PRODUCTS

(75) Inventor: Renato Arnaldi, Luxembourg (LU)

(73) Assignee: Soremartec S.A., Schoppach-Arlon (BE)

( * ) Notice: Subject to any disclaimer, the term of this patent is extended or adjusted under 35 U.S.C. 154(b) by 0 days.

(21) Appl. No.: 09/539,438

(22) Filed: Mar. 30, 2000

(30) Foreign Application Priority Data

Apr. 2, 1999 (EP) .......................................... 99830193.1

(51) Int. Cl.⁷ ............................................... B65D 25/54
(52) U.S. Cl. .................... 206/769; 206/459.5; 206/561; 426/128; 40/661
(58) Field of Search ................................. 206/769, 771, 206/551, 561, 564, 6.1, 459.1, 459.5; 426/119, 112, 124, 128; 359/619, 625, 626, 837, 455, 609, 628; 40/661; 220/602, 662, 663, 377

(56) References Cited

U.S. PATENT DOCUMENTS

| | | | | | |
|---|---|---|---|---|---|
| 2,961,108 A | * | 11/1960 | Johnson | ...................... | 206/377 |
| 3,604,559 A | * | 9/1971 | McCall | ...................... | 206/539 |
| 3,874,548 A | * | 4/1975 | Buff, Jr. | ...................... | 429/128 |
| 4,002,773 A | * | 1/1977 | Entenmann | ................. | 426/106 |
| 4,044,889 A | * | 8/1977 | Orentreich et al. | ......... | 206/459 |
| 4,508,216 A | * | 4/1985 | Kelman | ...................... | 206/5.1 |
| 4,867,303 A | * | 9/1989 | Beckerman et al. | ........ | 206/769 |
| 5,123,722 A | * | 6/1992 | Meymand | ................... | 359/592 |
| D358,091 S | * | 5/1995 | Warburton | .................... | D9/249 |
| 5,588,526 A | * | 12/1996 | Fantone et al. | .......... | 206/308.1 |
| 5,823,344 A | * | 10/1998 | Fantone et al. | .......... | 206/459.5 |
| 5,833,068 A | * | 11/1998 | Fantone | .................... | 206/459.1 |
| 5,850,913 A | * | 12/1998 | Fantone et al. | .......... | 206/308.1 |
| 5,912,033 A | * | 6/1999 | Ferguson | .................. | 426/124 |
| 5,941,382 A | * | 8/1999 | Fantone et al. | .......... | 206/308.1 |
| D420,285 S | * | 2/2000 | Sagan et al. | ................. | D9/429 |

FOREIGN PATENT DOCUMENTS

| | | |
|---|---|---|
| XH | DM033113 | 8/1995 |
| XH | DM040299 | 8/1997 |

\* cited by examiner

*Primary Examiner*—Shian Luong
(74) *Attorney, Agent, or Firm*—Rothwell, Figg, Ernst & Manbeck

(57) ABSTRACT

Packaging is preferably constituted by a box which includes a base part and a lid, preferably of transparent plastics material. Adjacent at least some of the sites provided to house the products, constituted usually by confectionery such as pralines, chocolates and the like, lens formations are arranged which draw attention to the corresponding products, both by creating light-reflecting effects similar to those seen in a jewel, and by making it easier to see the products, even when the packaging is viewed from a very narrow angle.

24 Claims, 3 Drawing Sheets

PACKAGING, IN PARTICULAR FOR FOOD PRODUCTS

BACKGROUND OF THE INVENTION

1. Field of the Invention

This invention relates to packaging according to the preamble of Claim 1.

2. Description of the Related Art

Packaging of this type is currently used, for example, for packing food products such as confectionery: pralines chocolates and the like. On this subject, see, for example, some of the packagings forming the subject of the International Models DM/033113 or DM/040299.

The aforesaid packagings are usually intended to contain one or several rows, possibly one layer above the other, of similar or different products.

Should the package house different products, it could prove advantageous to ensure that some products—perhaps because they are considered especially select or attractive— can be made to stand out from the others. This can be achieved, for example, by using wrappings for these products of a color which contrasts with that of the other products.

This arrangement is not always possible to put into practice however. There are situations, for example, where the products one would like to stand out have traditional wrappers which it would be a mistake to alter only to draw attention to them in a mixed pack. The same argument may apply in a complementary manner to the wrappers of other products intended for such packaging.

In any case, the above arrangement does not solve the problem of how to make particular products to stand out when the package, generally a box, is not viewed in plan (that is from a perspective that is perpendicular or substantially perpendicular to the plane of the row or rows of products) but from the side, with a fairly restricted angle of observation: typically, this situation occurs when the package is arranged on a shelf of a shop window or on a counter and is viewed horizontally or almost horizontally. It will be appreciated that this type of problem also arises in packs which contain products which are all the same.

SUMMARY OF THE INVENTION

The object of the present invention is thus to provide packaging of the type described above which is able to meet the requirements specified above, while avoiding the disadvantages described.

This object is achieved, according to the invention, by providing packaging having the characteristics claimed in the appended Claims.

In addition to providing an entirely satisfactory response to the requirements set out above, the packaging of the invention has the additional advantage that the characteristic lens formations of the packaging give a jewel-like effect, with reflected light creating an attractive sparkling effect which catches the attention of anyone looking at the packaging and the products contained therein.

BRIEF DESCRIPTION OF THE SEVERAL VIEWS OF THE DRAWINGS

The invention will now be described, purely by way of non-limitative example, with reference to the appended drawings, in which.

DETAILED DESCRIPTION OF THE PREFERRED EMBODIMENTS

Figure 1:
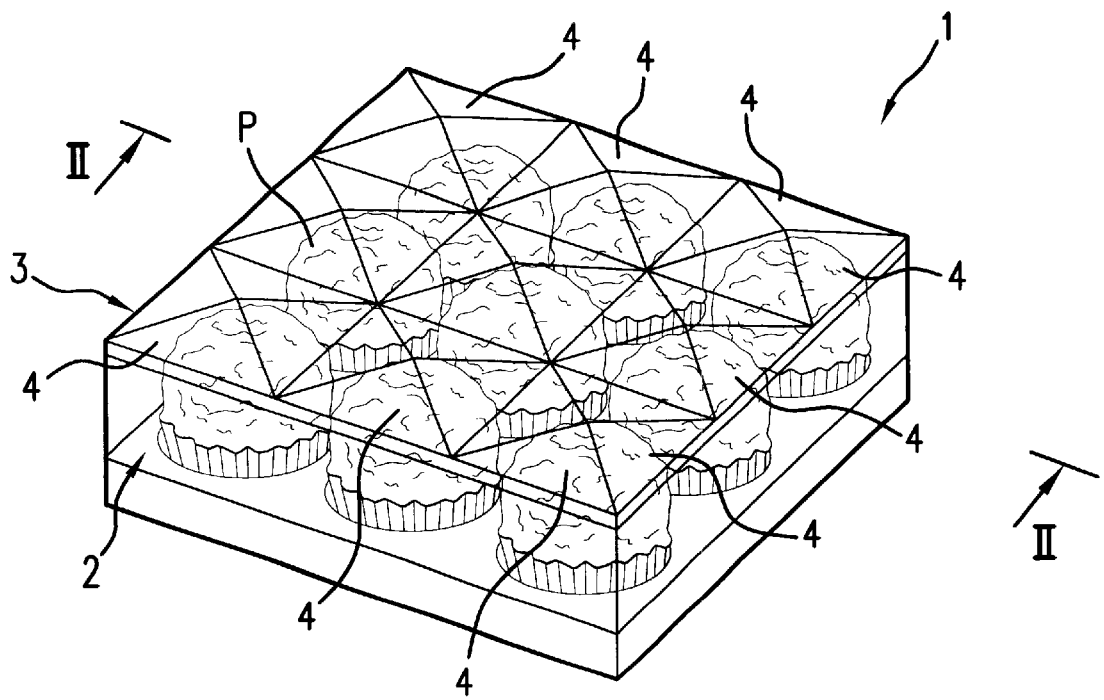
FIG. 1 is a perspective view of a package according to the invention.

In the drawings, the reference number 1 generally indicates a package which can be used, for example, to pack food products such as confectionery, that is pralines, chocolates and the like.

For example (without, of course, intending to limit the scope of the invention), the products P could be constituted for, example, by confectionery such as that sold under the brand names Ferrero Rocher, Confetteria Raffaello, Mon Cheri or Pocket Coffee by companies of the Ferrero group.

In the embodiments illustrated here, the package 1 is substantially in the shape of a more or less flattened box, comprising a bottom tray-shape part 2 with an associated removable lid 3 which closes the opening thereof.

In the examples illustrated, both the bottom 2 and the lid 3 are made entirely of a transparent material and the lens formations 4, which will be described in greater detail later, are present only on the lid 3.

It must be emphasized that these choices are purely by way of example as, for instance, the bottom tray 2 could be made, at least in part, of a non-transparent material, while the lens formations 4 could be only on the bottom tray 2 (around the sides thereof, for example) instead of only on the lid 3, or could be both on the bottom 2 and on the lid 3.

As will be understood more clearly from the description which follows, the use of a transparent material is important only in order to achieve the characteristic optical effect of the lens formations 4. The preferred choice, at least for the transparent components, is a plastics material such as clear polystyrene, for example.

Other options are of course possible, especially for the non-transparent portions (typically cardboard or card).

In the same way, the fact that the embodiments illustrated here refer to prismatic box-shaped packages which receive flat rows of products P inside them, should not be seen in any way as limiting the scope of the invention.

The arrangement of the invention is suited, in fact, to be applied to packaging of any shape (in addition, for example, to the rectangular box illustrated here, it could be circular, elliptical, heart-shaped, lobed, ring-shaped or any other curved and/or linear shape) and also to packaging intended to hold superposed layers of rows of products. It is also clear that the typical effect achieved by the use of the lens formations 4 applies primarily to the products arranged in a housing positions adjacent the said formations rather than to products which are concealed by other products—for instance as a result of several layers being one on top of the other.

The specific criteria involved in the manufacture of the package have little bearing on the achievement of the characteristic result of the invention (and are thus able to be modified within a broad range of possible alternative arrangements), in particular with regard to the housing and positioning of the products P within the packaging.

In this context, the appended drawings refer, purely by way of example, to an arrangement in which the bottom part 2 is constituted essentially by a sort of tray (see FIG. 2), comprising a flat bottom wall 20 surrounded by peripheral walls 21, with a liner 22 inserted therein. The latter is usually made of plastics material (so-called acetate), shaped, usually by heat molding, so as to form a plurality of cavities 23. Each cavity 23 forms, within the packaging 1, a housing for a product P. In the embodiment illustrated here, the products P are shown as approximately spherical pralines, wrapped in sheet material and resting in respective cups B of folded card.

Figure 2:
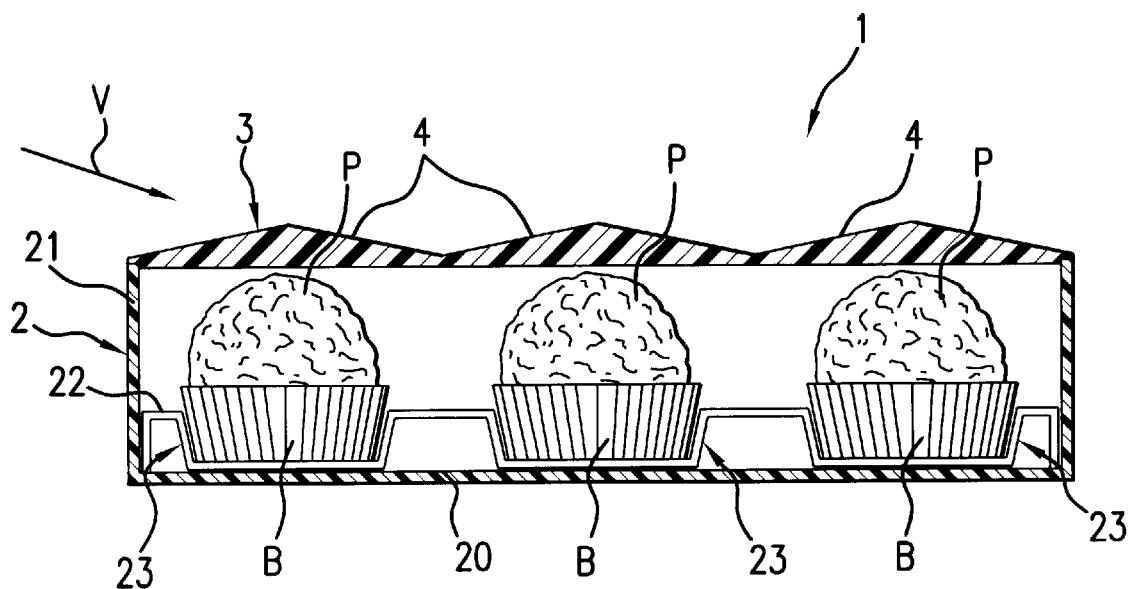
FIG. 2 is a section taken on the line II—II of FIG. 1.
Figure 3:
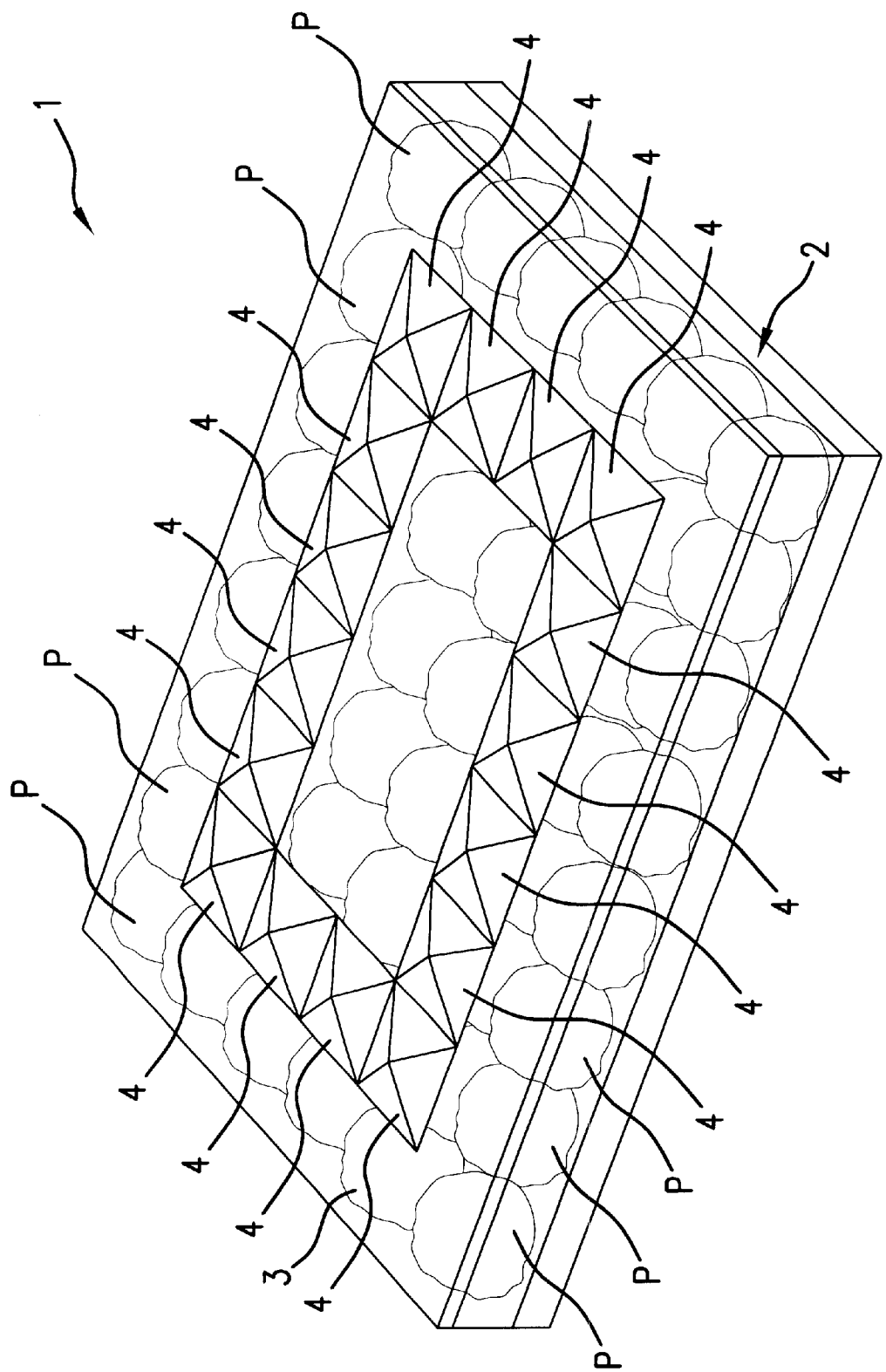
FIG. 3 illustrates a possible variant of the arrangement of the invention.

A vital characteristic of the arrangement of the invention consists in the fact that a respective lens formation 4 is arranged over each housing position of a product P, defined by a cavity 23 (see the examples of FIGS. 1 and 2), or over only some positions thereof (see the arrangement of FIG. 3).

In the embodiments illustrated here by way of example, the formations 4 are formed in the lid 3: however, as stated earlier, formations of this type could be arranged alternatively on the body 2 rather than on the lid 3, or both on the body 2 and on the lid 3.

In the embodiment illustrated, the lens formations 4 are defined by local variations in the thickness of the wall of the lid 3. In particular, each lens formation 4 is constituted by a respective portion of lid in the shape of a very squat, square-based pyramid. In other words, the lid is mo[u]lded in a raised, "diamond" pattern.

This embodiment has proved particularly advantageous in achieving the aim of drawing attention to a respective product P as described in the introduction to the present description. This is especially true (thanks to the number of faces making up each pyramid or diamond formation) of the so-called "jewel" effect observed when the packaging is viewed from a narrow angle of vision, as shown schematically by the arrow V of FIG. 2.

It is clear, however, that the aforesaid lens formations could also be shaped entirely differently. For example, while retaining a general pyramid shape, the base could differ from the square illustrated, being a triangle, a pentagon, a hexagon etc. Similarly, instead of having a pyramid shape, the formations 4 could be a frustum of a pyramid or of a cone, a section or a segment of a sphere etc.

Although the embodiment illustrated here provides for the thickness of the lid 3 (or, in general, of the respective part of the package 1) to vary at the site of each formation 4, so as to form an (at least slight) outward projection or protuberance on the packaging 1, this choice is in no way compulsory.

Figure 2A:
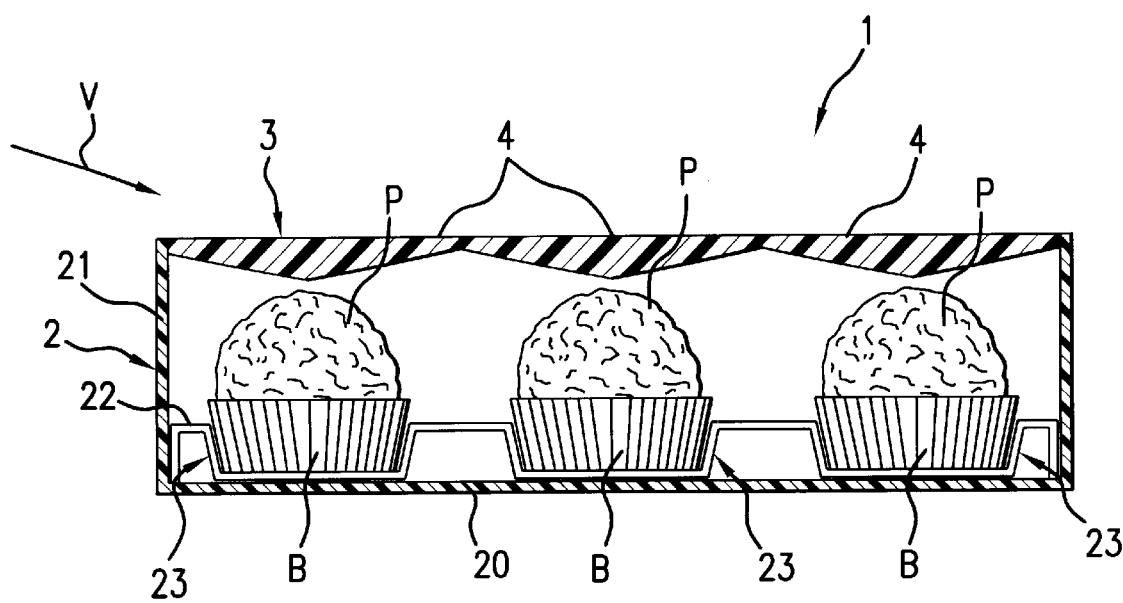
FIG. 2A is a section through an alternative embodiment of the package shown in FIG. 1.

For example, the variation in the thickness of the wall could go in the opposite direction, as shown in FIG. 2A, thereby keeping the outside of the box smooth, with the aforesaid projections or protuberances facing inwardly of the packaging, or forming convex or concave surfaces both inwardly and outwardly of the packaging 1.

The variation in the thickness of the wall, which in the example illustrated aims essentially to provide formations with a convex projecting surface (outwardly or inwardly of the packaging), could also work in the exact opposite way, creating a concave rather than convex surface at the site of each lens formation.

It is not in fact essential to act on the thickness of the wall, since the desired effect can be achieved, at least in some cases, by simply shaping the wall, rather than actually varying the thickness thereof.

The expressions "lens formation" and/or "lens means" are thus used here in the broadest meaning of the terms, thereby indicating any body of at least partially transparent material (the material may in fact be pigmented) limited by two surfaces, the one flat and the other shaped or both shaped.

It will be appreciated that, as indicated earlier, the arrangement of the invention is suited either to drawing attention to all the products P in the packaging 1 or to just some of these.

Thus, in the embodiment illustrated in FIGS. 1 and 2, a lens formation 4 is provided for each position housing a product P. In this case, all the products P contained in the packaging adjacent the lid 3 benefit from the characteristic ability of the invention to draw attention.

In the embodiment of FIG. 3 on the other hand, only a few of the positions provided for housing products P have associated lens formations 4 in the lid 3. In this case, the characteristic ability of the invention to draw attention is focused on the products P housed in the said positions, although not exclusively.

Naturally, the principle of the invention remaining the same, manufacturing details and embodiments may be widely varied from those described and illustrated, without departing thereby from the scope of the present invention.

What is claimed is:

1. A package which includes:
   a plurality of food products;
   a container body comprising walls, a top, and a liner;
   the liner of said container body defining a plurality of individual housing sites for said plurality of individual food products;
   wherein each said individual housing site defines a cavity having a bottom; and
   wherein said top has a respective individual prismatic lens means adjacent at least some of said plurality of individual housing sites.

2. A package according to claim 1, wherein said lens means is formed by a portion of wall of varying thickness.

3. A package according to claim 1, wherein said lens means is defined by a wall element projecting outwardly of the packaging.

4. A package according to claim 1, wherein said lens means is defined by a wall element projecting inwardly of the packaging.

5. A package according to claim 1, wherein said lens means is of pyramid shape.

6. A package according to claim 5, wherein said pyramid shape has a square base.

7. A package according to claim 1, wherein said container body includes a base part and a lid arranged to cover said base part and in that said lens means is formed in the lid.

8. A package according to claim 1, wherein a respective lens means is provided for each of said housing sites.

9. A package according to claim 1, wherein a respective lens means is provided for only some of said housing sites.

10. A package according to claim 7, wherein said container body includes a plurality of said housing sites and a plurality of lens means arranged on said lid in positions corresponding to respective housing sites.

11. A package according to claim 1, wherein said walls are constituted, at least adjacent said respective lens means, of a transparent, or substantially transparent, plastics material.

12. A package according to claim 1, wherein said container body is generally box-shaped.

13. A package according to claim 12, wherein said container body has a generally flat shape and has a plurality of sites for housing food products arranged in flat rows.

14. A package according to claim 12, wherein said container body includes a plurality of sites for housing food products arranged in rows and lens means are provided for at least one housing site positioned adjacent said walls.

15. An ornamental package for individual food products comprising:
- a plurality of food products;
- a container body having a floor, walls and a removable top;
- the floor defining a plurality of seats, with each seat having a bottom and capable of receiving one said individual food product; and
- a plurality of individual prismatic lenses in the removable top, the individual lenses being adjacent at least some of each of said corresponding seats.

16. A package according to claim 15, wherein a respective lens is provided for each of said housing sites.

17. A package according to claim 15, wherein said lens is of pyramid shape.

18. A package according to claim 17, wherein said pyramid shape has a square base.

19. A package according to claim 15, wherein said walls are substantially transparent.

20. A package for a plurality of individual food products comprising:
- a plurality of individual food products;
- a container body comprising walls and a top;
- a liner within said container body defining a plurality of individual housing seats in the form of individual cavities with bottoms for said plurality of individual food products; and
- a plurality of individual prismatic lenses in said top adjacent at least some of said plurality of individual housing seats.

21. A package according to claim 20, wherein a respective lens is provided for each of said housing sites.

22. A package according to claim 20 wherein said lens is of pyramid shape.

23. A package according to claim 22, wherein said pyramid shape has a square base.

24. A package according to claim 20, wherein said walls are substantially transparent.

* * * * *